United States Patent [19]

Travieso et al.

[11] Patent Number: 5,943,455
[45] Date of Patent: Aug. 24, 1999

[54] METHOD AND APPARATUS FOR INTERFACING OPTICAL FIBERS FROM OPTICAL FIBER RIBBONS AND CABLES WITH AN OPTICAL INTEGRATED CIRCUIT

[75] Inventors: Ruben Travieso, Alpharetta, Ga.;
William R. Holland, Warrington, Pa.;
George F. Deveau, Cumming, Ga.

[73] Assignee: Lucent Technologies Inc., Murray Hill, N.J.

[21] Appl. No.: 08/844,527

[22] Filed: Apr. 18, 1997

[51] Int. Cl.⁶ ..................................................... G02B 6/26
[52] U.S. Cl. ................................................. 385/24; 385/14
[58] Field of Search ................................. 385/24, 14, 15, 385/54, 134, 49, 76, 51

[56] References Cited

U.S. PATENT DOCUMENTS

| | | | |
|---|---|---|---|
| 5,259,051 | 11/1993 | Burack et al. | 385/76 |
| 5,568,575 | 10/1996 | Sato | 385/16 |
| 5,715,339 | 2/1998 | Takai et al. | 385/24 |
| 5,778,116 | 7/1998 | Tomich | 385/16 |

*Primary Examiner*—John D. Lee
*Assistant Examiner*—Ellen E. Kang

[57] ABSTRACT

The present invention provides a method and apparatus for interfacing optical fiber cables with an optical integrated circuit. The apparatus comprises a flexible substrate having optical fibers fixedly arranged therein in a predetermined manner such that the distal ends of the optical fibers are disposed in groups on the outer periphery of the substrate to facilitate joining of the fibers with optical fibers of the optical fiber cables or ribbons using mass joining techniques. Once the optical fibers have been arranged in the substrate, the optical integrated circuit is mounted in the substrate. The substrate has an opening formed therein for receiving the optical integrated circuit. Once the optical integrated circuit has been mounted in the substrate, the proximal ends of the fibers fixed in the substrate are optically coupled to the ports of the optical integrated circuit.

11 Claims, 2 Drawing Sheets

METHOD AND APPARATUS FOR INTERFACING OPTICAL FIBERS FROM OPTICAL FIBER RIBBONS AND CABLES WITH AN OPTICAL INTEGRATED CIRCUIT

TECHNICAL FIELD OF THE INVENTION

The present invention relates to a method and apparatus for interfacing optical fibers from optical fiber ribbons and cables with an optical integrated circuit and, more particularly, to a system wherein individual optical fibers connected to the ports of an optical integrated circuit are fixedly arranged in a flexible substrate in a predetermined fashion to facilitate interfacing with optical fibers from optical fiber ribbons and cables.

BACKGROUND OF THE INVENTION

Optical Application Specific Integrated Circuits (OASICs) are integrated circuits which operate on light to perform one or more functions. OASICs are optical waveguides which contain optical paths for light to travel in and optical operators which operate on the light to perform specific functions. Such operations include, for example, splitting light so that light on one optical path is split onto several optical paths. In this case, the light in each optical path carries the same information but at a lower power level than the power level of the light before it was split. Optical combiners operate on light to combine light from several optical paths into one optical path. Another type of operation performed by OASICs is wavelength division multiplexing (WDM) wherein light comprising a plurality of wavelengths traveling along one optical path is operated on to spatially separate light of different wavelengths. WDM allows information to be sent on one optical fiber at different frequencies and to be separated out by frequency by the OASIC into spatially separated optical paths.

OASICs have input ports which are intended to be coupled to incoming optical fibers for receiving light therefrom and output ports which are intended to be coupled to outgoing optical fibers for outputting light thereto after it has been operated on by the OASIC. It is often desirable to connect the OASIC to several optical fiber cables. For example, it is often desirable to connect the OASIC to one optical fiber cable coming from the central office and to another optical fiber cable coming from the subscriber's premises. Each of the optical fiber cables normally contain many optical fibers. Rather than connect the fibers from the cables directly to the OASIC in the field, optical fiber ribbons normally are connectorized, or terminated, to the OASIC in the plant so that they are sold to customers with an optical fiber ribbon connected to each side of the OASIC. The optical fibers from the cables are then optically coupled to the appropriate port of the OASIC by splicing certain optical fibers from the cables with certain optical fibers from the ribbon connected to the OASIC. This may be accomplished by, for example, single-fiber fusion splicing, which normally requires breaking out individual fibers from the ribbons and splicing them with individual fibers from the cables.

In order to maximize the density or number of circuits on an OASIC substrate, they generally are not designed with all of the ports to be connected to one cable or ribbon on one side of the chip and all of the ports to be connected to another cable or ribbon on the other side of the chip. This is because the optical paths cannot bend beyond a certain amount without attenuating the optical signal and also because of limits on crossovers of waveguides within the OASIC. Therefore, ports to be connected to fibers from each cable or ribbon generally are located on both sides of the chip. As a result, some of the fibers of a given ribbon connected to the OASIC will have to be spliced with fibers from one cable or ribbon while other fibers of the same ribbon connected to the OASIC will have to be spliced with fibers from the other cable or ribbon. The result is that the splicing task is difficult to perform and prone to human error because it requires breaking out and splicing of individual fibers. Therefore, this type of arrangement is not suitable for interconnection of mass optical fiber connections by mass splicing (e.g., the splicing of one fiber ribbon with another fiber ribbon by mass fusion splicing) because the optical fibers connected to the ports of the OASIC are not arranged to facilitate mass splicing.

Accordingly, a need exists for method and apparatus for interfacing optical fibers from optical fiber cables and ribbons with optical integrated circuits which allows the fibers of the cables or ribbons to be easily coupled to the fibers connected to the optical integrated circuit by using mass joining techniques such as mass fusion splicing, mass mechanical splicing or mass connectorization.

SUMMARY OF THE INVENTION

The present invention provides a system for interfacing optical fibers from optical fiber cables and ribbons with an optical integrated circuit. The system of the present invention comprises a flexible optical substrate having communication ports located on the periphery thereof, an opening formed in the optical substrate for receiving an optical integrated circuit, and optical fibers routed through the optical substrate for optically connecting ports of the optical integrated circuit with the ports on the periphery of the optical substrate. When an optical integrated circuit is mounted in the optical substrate, the fibers are optically coupled at their proximal ends to the ports of the optical integrated circuit. The distal ends of the fibers are disposed on the periphery of the optical substrate. The distal ends of the fibers arranged in the substrate are grouped on the periphery of the substrate in such a manner that they can easily be connected to fibers of optical fiber cables or ribbons.

In an illustrative embodiment, the apparatus of the present invention is designed to be connected to optical fibers of at least two optical fiber ribbons. Each ribbon contains fibers which transmit information in the upstream direction (hereinafter "upstream fibers") and fibers which transmit information in the downstream direction (hereinafter "downstream fibers"). In accordance with this embodiment, the fibers routed through the substrate (hereinafter "substrate fibers") are arranged in such a manner that the distal ends of all of the substrate fibers which are intended to be spliced with the fibers of the first ribbon are grouped together at a first location on the periphery of the substrate to allow the substrate fibers and the fibers of the first ribbon to be connected together by using mass joining techniques, such as mass fusion splicing. Similarly, the distal ends of all of the substrate fibers which are intended to be spliced with the fibers of the second ribbon are grouped together at a second location on the periphery of the substrate to allow the substrate fibers and the fibers of the second ribbon to be connected together by using mass joining techniques, such as mass fusion splicing.

DETAILED DESCRIPTION OF THE INVENTION

Figure 1:
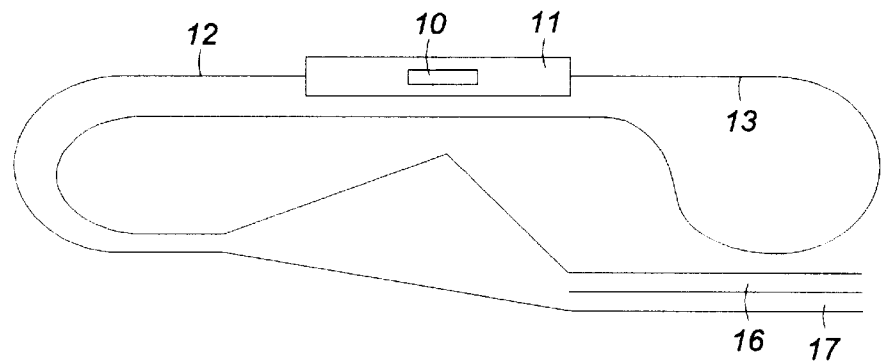
FIG. 1 illustrates a schematic diagram of an optical integrated circuit having a pair of fiber ribbons routed through an optical substrate and attached to the optical integrated circuit in accordance with the present invention.

FIG. 1 illustrates a functional schematic diagram of the system of the present invention wherein an optical application specific integrated circuit (OASIC) 10 is mounted in an optical substrate 11. Prior to mounting the OASIC 10 in the substrate 11, optical fibers (not shown) are routed through the optical substrate 11 in such a manner that the proximal ends of the fibers are disposed for easily interfacing them with the OASIC 10 and the distal ends are disposed on the periphery of the substrate 11 so that they can easily be connected to a pair of fiber ribbons 12, 13 from optical fiber cables (not shown). It should be noted that although the present invention is being discussed herein with respect to optical fiber ribbons and/or cables, the present invention can be implemented with optical fibers which are contained in loose bundles in cables and which are ribbonized in the field and with optical fiber ribbons. Therefore, the term "optical fiber cables", as that term is used in the specification, abstract and claims of the present application, includes, but is not limited to, all of the above-referenced forms for carrying optical fibers.

In accordance with the present invention, the fibers disposed in the optical substrate 11 are routed through the substrate 11 prior to the OASIC 10 being mounted in the substrate 11. Once the fibers have been routed through the substrate 11, the OASIC 10 is mounted in the substrate 11 and the proximal ends of the fibers (not shown) are connected to the OASIC 10. Preferably, the steps of routing the fibers through the substrate 11, mounting the OASIC 10 within the substrate 11, and connecting the fibers to the OASIC 10 are performed in the factory. In the field, an installer connects the ribbon fibers 12, 13 to the distal ends of the fibers disposed on the periphery of the substrate 11. Preferably, the distal ends of the fibers fixed in the substrate 11 are arranged so that they can easily be connected to ribbon fibers 12, 13 by fusion splicing.

Figure 2:
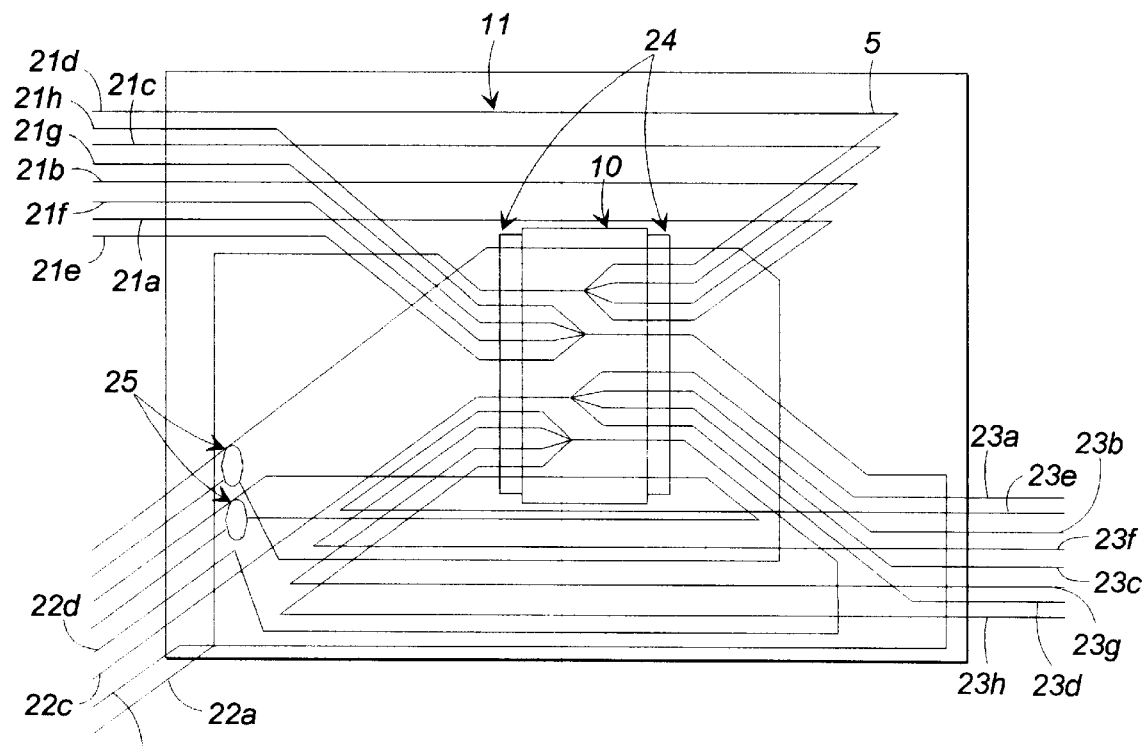
FIG. 2 illustrates a functional schematic diagram of the system of the present invention for interfacing optical fiber cables or ribbons with an optical integrated circuit in accordance with a first illustrative embodiment of the present invention.

FIG. 2 shows a more detailed functional schematic diagram of the system of FIG. 1. The system of the present invention comprises an OASIC 10 which is mounted in an optical substrate 11. The OASIC 10 shown here for illustrative purposes is a simple power splitter. However, it should be noted that the present invention is not limited with respect the type of OASIC used.

The OASIC could be, for example, a Wave Division Multiplexer (WVDM), a Dense Wave Division Multiplexer (DWDM), or a combined circuit incorporating WDM, DWDM and power splitters. Prior to mounting the OASIC 10 in the optical substrate 11, a plurality of substrate optical fibers, generally denoted by numeral 5, are routed through and fixed in the substrate 11 as shown. It should be noted that although the substrate fibers 5 are sometimes depicted in FIG. 2 as being sharply turned or bent, this is only for the purpose of demonstrating the grouping of the substrate fibers on the periphery of the substrate 11. When physically implemented, the substrate fibers will be routed in such a manner that constraints on the bending radius of the substrate fibers will be observed.

Once the fibers 5 have been arranged in the substrate 11, the fibers 5 are optically coupled at their proximal ends to the OASIC 10 at the fiber array interconnections 24. Preferably, the proximal ends of the fibers 5 are coupled to OASIC 10 using one of the interconnection methods disclosed in Deveau, U.S. Pat. No. 5,559,915, which is incorporated herein by reference. However, it will be apparent to those skilled in the art that other interconnection methods are suitable for interconnecting the fibers 5 with OASIC 10. The substrate fibers 5 are routed through the substrate 11 in such a manner that the distal ends of the substrate fibers 5 are grouped on the periphery of substrate 11 according to the optical fiber cables or ribbons to which they are to be attached. In order to illustrate this point, FIG. 2 will be discussed with reference to the use of the system of the present invention to interface subscribers with a central office. Information being carried on an optical fiber coming from the central office is split into several optical paths by the OASIC 10. Each optical path carries information to be sent to different subscribers, or to another node where the optical signal may be further divided.

For example, the information being carried downstream from the central office on optical fiber 22a will be split by OASIC 10 and output from OASIC 10 onto the substrate optical fibers 5 which are spliced with fibers 21a, 21b, 21c and 21d of the subscriber premises cable (not shown). Substrate fibers 25 simply provide a test path through OASIC 10 for testing the OASIC 10. Optical fibers 21a, 21b, 21c and 21d will carry information downstream to the subscribers' premises. In a similar manner, information being sent upstream from the subscribers' premises on optical fibers 21e, 21f, 21g and 21h will be transmitted over the respective substrate fibers, combined by OASIC 10 and output on optical fiber 22b. Information being sent downstream to the subscribers' premises on optical fiber 22c will be split by OASIC 10 and output from OASIC onto the substrate optical fibers 5 which are spliced with fibers 23a, 23b, 23c and 23d of the subscriber premises cable (not shown). Information being sent upstream from the subscribers' premises on optical fibers 23e, 23f, 23g and 23h will be transmitted over the respective substrate fibers, combined by OASIC 10 and output on optical fiber 22d. Therefore, the distal ends of the substrate optical fibers 5 are disposed on the periphery of substrate so that they can easily be spliced with the optical fibers from the optical fiber cables. Preferably, the substrate fibers 5 are spaced and grouped so that they can be joined with an optical fiber ribbon containing fibers 21a–21h and with an optical fiber ribbon containing fibers 23a–23h. The substrate fibers 5 preferably are routed through the substrate 11 in the manner disclosed in Burack et al., U.S. Pat. No. 5,259,051, issued Nov. 2, 1993, which is incorporated herein by reference, and then are connected to the OASIC 18.

Figure 3:
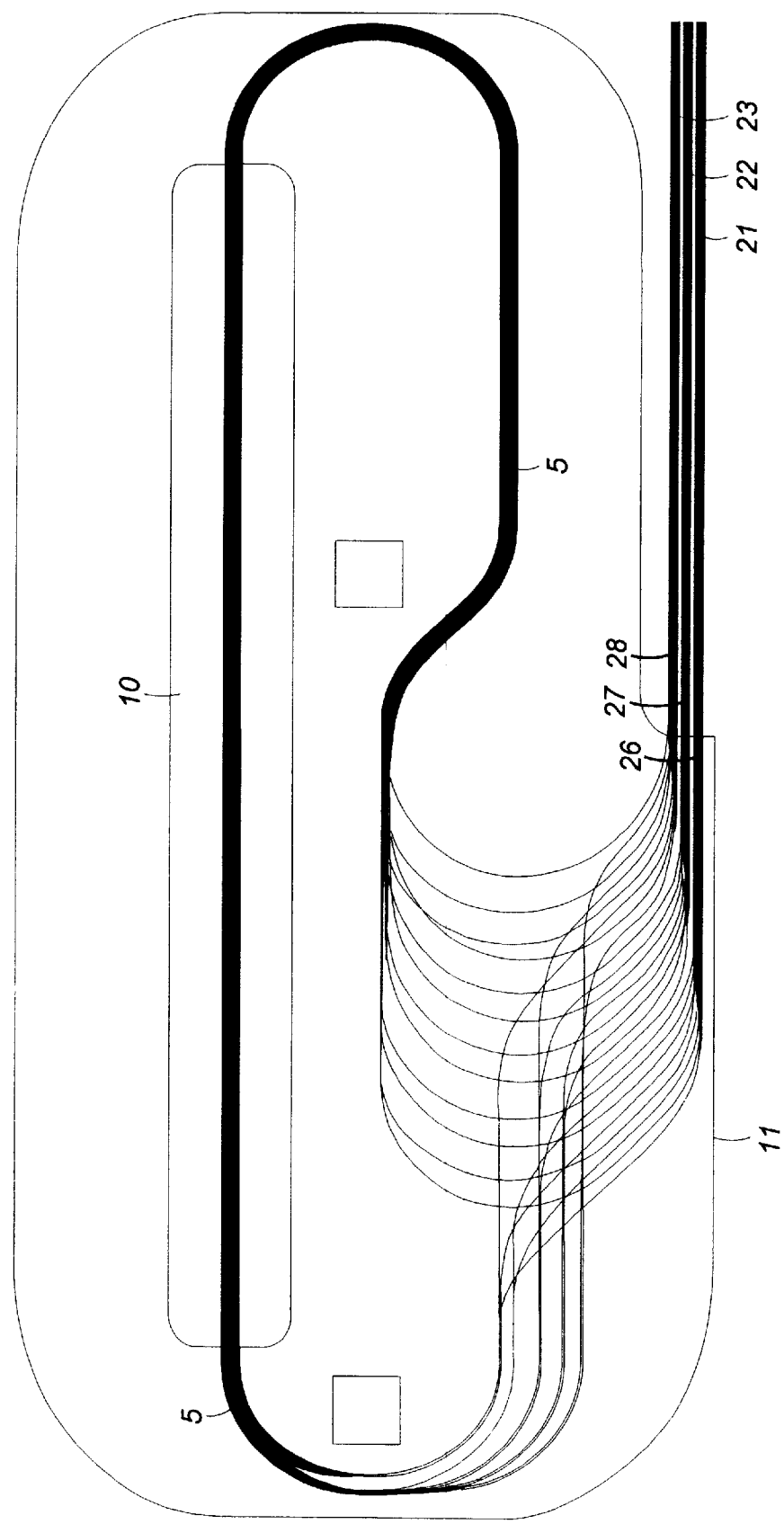
FIG. 3 illustrates an example of a physical embodiment of the system of the present invention schematically illustrated in FIG. 2.

FIG. 3 illustrates a physical embodiment of the system of the present invention shown in FIG. 2. In this embodiment, the distal ends of the substrate fibers 5 are grouped into three discrete groups 26, 27 and 28 in the manner discussed above. The distal ends of the substrate fibers of groups 26, 27 and 28 preferably are arranged and spaced in the form of fiber ribbons 21, 22 and 23, respectively, so that they can easily be spliced with optical fiber ribbons by using mass fusion splicing. By grouping the substrate fibers in this manner, the groups of substrate fibers can by easily and quickly spliced with the fiber ribbons by mass splicing, such as by fusion splicing. It can be seen from a comparison of FIGS. 2 and 3 that it is the grouping of the substrate fibers into discrete groups on the periphery of the substrate that is important, not the locations of those groups. It should also be noted that the present invention is not limited with respect to the number of optical fibers and optical fiber cables implemented by the system of the present invention. Similarly, the present invention is not limited with respect to the number of groups into which the substrate fibers can be divided. Also, the present invention is not limited to any particular type of optical integrated circuit or with respect to the types of operations performed by the optical integrated circuit. It will also be apparent to those skilled in the art that the present invention is not limited with respect to the location at which the system of the present invention is installed and/or the types of cables with which the system of the present invention is interfaced. It will be apparent to those skilled in the art that other modifications can be made to the present invention which are within the spirit and scope of the present invention.

What is claimed is:

1. An apparatus for interfacing an optical integrated circuit with first and second optical fiber cables, said first and second optical fiber cables each comprising a plurality of optical fibers, said apparatus comprising:

a flexible substrate having an opening therein for receiving an optical integrated circuit, said optical integrated circuit having a first side, a second side, and a plurality of ports comprising a first subset of ports disposed on said first side and a second subset of ports disposed on said second side, said flexible substrate having an outer periphery;

a plurality of optical fibers fixedly arranged on said substrate, each optical fiber having a proximal end and a distal end, wherein distal ends which are to be connected to optical fibers of said first optical fiber cable are grouped together into a first group on the outer periphery of said substrate, and wherein distal ends which are to be connected to optical fibers of said second optical fiber cable are grouped together into a second group on the outer periphery of said substrate, said proximal ends being disposed adjacent said opening for connection to said plurality of ports such that a first one of said proximal ends corresponding to said optical fibers which are to be connected to optical fibers of said first optical fiber cable is connected to one of said ports in said first subset and a second one of said proximal ends corresponding to said optical fibers which are to be connected to optical fibers of said first optical fiber cable is connected to one of said ports in said second subset.

2. The apparatus of claim 1 wherein, said first and second groups are spatially separated from one another on the outer periphery of said substrate.

3. The apparatus of claim 2 wherein, the distal ends of said first group are spatially separated from one another by an amount approximately equal to an amount by which optical fibers in a first optical fiber ribbon are spatially separated from one another so that the distal ends of said first group can be connected to distal ends of the optical fibers of the first optical fiber ribbon by using mass splicing techniques, and wherein the distal ends of said second group are spatially separated from one another by an amount approximately equal to an amount by which optical fibers in a second optical fiber ribbon are spatially separated from one another so that the distal ends of said second group can be connected to distal ends of the optical fibers of the second optical fiber ribbon by using mass splicing techniques.

4. The apparatus of claim 1 wherein the proximal ends of the fibers fixedly arranged in said substrate are spatially separated from one another by an amount approximately equal to an amount by which ports of the optical integrated circuit are separated from one another.

5. An apparatus for interfacing first and second optical fiber cables with an optical integrated circuit, each of said first and second cables containing a plurality of optical fibers, said apparatus comprising:

a flexible substrate having an optical integrated circuit mounted therein, said optical integrated circuit having a first side, a second side, and a plurality of communication ports for inputting optical information into and outputting optical information from said optical integrated circuit, the plurality of communication ports comprising a first subset of ports disposed on said first side and a second subset of ports disposed on said second side, said flexible substrate having communication ports on an outer periphery thereof;

a plurality of optical fibers, each optical fiber having a proximal end and a distal end, said optical fibers being optically coupled at their proximal ends to the communication ports of said optical integrated circuit such that a first one of said proximal ends corresponding to said optical fibers which are to be connected to optical fibers of said first optical fiber cable is connected to one of said ports in said first subset and a second one of said proximal ends corresponding to said optical fibers which are to be connected to optical fibers of said first optical fiber cable is connected to one of said ports in said second subset, each said optical fiber being fixedly arranged in said flexible substrate such that the distal ends of said optical fibers are disposed in the communication ports of said flexible substrate, and wherein all of the optical fibers fixedly arranged in said flexible substrate which are to be connected to optical fibers of said first cable have their distal ends grouped together into a first group on the periphery of said flexible substrate and wherein all of the optical fibers fixedly arranged in said flexible substrate which are to be connected to optical fibers of said second cable have their distal ends grouped together into a second group on the periphery of said flexible substrate.

6. The apparatus of claim 5 wherein the distal ends of said first group of optical fibers are disposed at a first location on the periphery of said substrate and wherein the distal ends of said second group of optical fibers are disposed at a second location on the periphery of said substrate.

7. The apparatus of claim 6 wherein the distal ends of said first group of optical fibers are spatially separated from one another by an amount approximately equal to an amount by which optical fibers in a first optical fiber ribbon are spatially separated from one another so that the distal ends of said first group of optical fibers can be connected to distal ends of the optical fibers of the first optical fiber ribbon by using mass splicing techniques, and wherein the distal ends of said second group of optical fibers are spatially separated from one another by an amount approximately equal to an amount by which optical fibers in a second optical fiber ribbon are spatially separated from one another so that the distal ends of said second group of optical fibers can be connected to distal ends of the optical fibers of the second optical fiber ribbon by using mass splicing techniques.

8. The apparatus of claim 5 wherein the proximal ends of the fibers fixedly arranged in said substrate are spatially separated from one another by an amount approximately equal to an amount by which ports of the optical integrated circuit are separated from one another.

9. A method for interfacing an optical integrated circuit with first and second sets of optical fibers, each of said first and second sets of optical fibers comprising a plurality of optical fibers, said method comprising the steps of:

fixedly arranging a plurality of optical fibers on a flexible substrate, said flexible substrate having an outer periphery, wherein said flexible substrate has an opening therein for receiving an optical integrated circuit, wherein each optical fiber arranged on said substrate has a proximal end and a distal end;

disposing said distal ends on the outer periphery of said substrate in a first group and a second group, wherein said first group is spatially separated from said second croup, and wherein said distal ends of said first group are to be connected to optical fibers of said first set of optical fibers and wherein said distal ends of said second group are to be connected to optical fibers of said second set of optical fibers, said proximal ends being disposed adjacent said opening for connection to the optical integrated circuit;

placing an optical integrated circuit in the opening formed in said flexible substrate, wherein said optical integrated circuit has a first side, a second side, and a plurality of communication ports comprising a first subset of ports disposed on said first side and a second subset of ports disposed on said second side; and optically coupling said proximal ends to said communication ports such that a first one of said proximal ends corresponding to said optical fibers which are to be connected to optical fibers of said first set of optical fibers is connected to one of said ports in said first subset and a second one of said proximal ends corresponding to said optical fibers which are to be connected to optical fibers of said first set of optical fibers is connected to one of said ports in said second subset.

10. The method of claim 9 wherein said first set of optical fibers are comprised in a first optical fiber ribbon and wherein said second set of optical fibers are comprised in a second optical fiber ribbon, said first group of distal ends being disposed on the periphery of said substrate so that the distal ends of said first group can be connected to the optical fibers of said first set by mass fusion splicing, said second group of distal ends being disposed on the periphery of said substrate so that the distal ends of said second group can be connected to the optical fibers of said second set by mass fusion splicing.

11. A method for interfacing an optical integrated circuit with first and second optical fiber ribbons, said optical integrated circuit having a first side, a second side, and a plurality of communication ports comprising a first subset of ports disposed on said first side and a second subset of ports disposed on said second side, each of said first and second optical fiber ribbons comprising a plurality of optical fibers, said method comprising the steps of:

splicing optical fibers of said first optical fiber ribbon with a first group of optical fibers disposed on a substrate, wherein the optical fibers of the first group have proximal ends which are optically coupled to said plurality of communication ports such that a first one of said proximal ends corresponding to said first group of optical fibers is connected to one of said ports in said first subset and a second one of said proximal ends corresponding to said first group of optical fibers is connected to one of said ports in said second subset, and wherein the optical fibers of said first group have distal ends disposed on a periphery of said substrate, wherein the distal ends of said first group are spliced with the optical fibers of said first optical fiber ribbon using a mass splicing technique;

splicing optical fibers of said second optical fiber ribbon with a second group of optical fibers disposed on a substrate, wherein the optical fibers of said second group have proximal ends which are optically coupled to said plurality of communication ports, and wherein the optical fibers of said second group have distal ends disposed on the periphery of said substrate, wherein the distal ends of said second group are spliced with the optical fibers of said second optical fiber ribbon using a mass splicing technique.

* * * * *